(12) United States Patent
Reisinger et al.

(10) Patent No.: US 6,986,816 B2
(45) Date of Patent: Jan. 17, 2006

(54) METHOD FOR REMOVING DEPOSITS FROM CHEMICAL REACTORS

(75) Inventors: Claus-Peter Reisinger, Neusäss (DE); Sven Michael Hansen, Leverkusen (DE); Peter Fischer, Köln (DE); Konrad Triebeneck, Bergisch Gladbach (DE); Joachim Helbig, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 15 days.

(21) Appl. No.: 10/484,179

(22) PCT Filed: Jul. 8, 2002

(86) PCT No.: PCT/EP02/07571

§ 371 (c)(1),
(2), (4) Date: May 21, 2004

(87) PCT Pub. No.: WO03/008116

PCT Pub. Date: Jan. 30, 2003

(65) Prior Publication Data

US 2004/0194805 A1 Oct. 7, 2004

(30) Foreign Application Priority Data

Jul. 19, 2001 (DE) .......................... 101 35 318

(51) Int. Cl.
*B08B 7/00* (2006.01)

(52) U.S. Cl. .................. 134/6; 134/7; 134/8; 134/22.1; 134/32; 134/34; 134/42

(58) Field of Classification Search .................... 134/6, 134/7, 8, 22.1, 42, 32, 34
See application file for complete search history.

(56) References Cited

U.S. PATENT DOCUMENTS

| 3,071,498 A | * | 1/1963 | Kaskel ........................... 134/7 |
| 3,119,720 A | * | 1/1964 | Stiles et al. ............... 134/22.19 |
| 3,776,774 A | * | 12/1973 | Miller ........................... 134/7 |

FOREIGN PATENT DOCUMENTS

| EP | 0053355 | | 11/1981 |
| GB | 1513152 | * | 5/1978 |
| WO | WO 03/008116 A1 | * | 1/2003 |

* cited by examiner

*Primary Examiner*—Sharidan Carrillo
(74) *Attorney, Agent, or Firm*—Joseph C. Gil; Aron Preis

(57) ABSTRACT

The invention relates to a process for the removal of deposits formed in a reaction apparatus by the precipitation of solids from a liquid reaction mixture, which process is characterized in that particles of a material that is inert under the reaction conditions are introduced into the reaction apparatus, which particles, by suitable mechanical circulation of the reaction mixture, are so moved through the reactor that, during the reaction, by striking the walls or other built-in elements, they abrasively remove precipitates adhered thereto.

11 Claims, No Drawings

US 6,986,816 B2

METHOD FOR REMOVING DEPOSITS FROM CHEMICAL REACTORS

BACKGROUND OF THE INVENTION

The invention relates to a process for the removal of deposits which form in a reaction apparatus by the precipitation of solids from a gaseous, liquid or liquid/gaseous reaction mixture or from a suspension.

Such deposits on reactors or other surfaces in contact with the reaction medium may consist, for example, of organic or inorganic solids which crystallise out, metallic mirrors, polymers, tarred reaction residues or other solids adsorbed at the reactor surfaces.

According to the prior art, such deposits are generally removed batchwise by mechanical and/or chemical cleaning operations, which take place as long as the reaction apparatus is not in operation (see EP 121 263 A1, WO 99/05251). As a result of such cleaning, therefore, the reaction apparatus is used less fully in terms of time, which is economically disadvantageous.

In addition, such a procedure means that the precipitates are left in place for a relatively long time. If deposits on reactor walls, pipes and built-in elements are not removed early, they can lead to disadvantageous secondary reactions during chemical reactions. Precipitates may thus age, become compacted or crystallise. The relatively long dwell time in the reactor in comparison with the reaction mixture can lead, for example by condensation, polymerisation or crosslinking, to deposits which are more difficult to remove chemically or mechanically. Organic compounds may crack or carbonise. If such deposits become detached in an uncontrolled manner, they can have an adverse effect on product properties.

The deposits may also be valuable components of a reaction mixture, such as, for example, homogeneous catalysts or their degradation products. If such expensive components cannot be discharged from the reaction apparatus with the reaction mixture, they avoid a subsequent working-up or separation step and therefore cannot be used again in the reaction in processed form.

An example of the occurrence of deposits in a chemical reaction is the process of the direct carbonylation of hydroxy aromatic compounds to diaryl carbonates. It is known that organic carbonates can be prepared by oxidative reaction of an aromatic hydroxy compound with carbon monoxide in the presence of a noble metal catalyst (DE-A-2 738 437). Palladium is preferably used as the noble metal. A co-catalyst (e.g. manganese, lead or cobalt salts), a base, a quaternary salt, various quinones or hydroquinones and drying agents can additionally be used. The operation can be carried out in a solvent such as, for example, acetonitrile, monochlorobenzene or dimethylacetamide.

In that process, catalyst components may precipitate during the reaction and be deposited on the surfaces of the reaction apparatus. It is assumed that the deposits are essentially precipitated palladium metal; the precise chemical composition of such deposits is unimportant for the process according to the invention, however. Owing to the high costs of palladium, it must be recovered from the reaction mixture. However, it is not possible to convey the palladium deposited in the reactor to a separation and processing step.

It is therefore desirable to elaborate a process which removes such deposits and allows the deposits to be discharged from the reactor with the reaction mixture.

SUMMARY OF THE INVENTION

The present Application relates to such a process for the removal of deposits which form in a reaction apparatus by the precipitation of solids from a gaseous, liquid or liquid/gaseous reaction mixture, from a suspension or from a sol, which process is characterised in that particles of a material that is inert under the reaction conditions are introduced into the reaction apparatus or other surfaces which are in contact with the reaction medium, which particles, by suitable mechanical circulation of the reaction mixture, are so moved over the surfaces that, by striking the walls or other built-in elements, they abrasively remove precipitates adhered thereto.

Deposits are any highly viscous liquids or solids that are able to precipitate by adsorption at the surfaces of the reaction apparatuses. They may be starting materials, impurities thereof, reaction products, intermediates, by-products, catalysts, phase mediators, stabilisers or other auxiliary substances. They may be organic or inorganic crystallisation products or glasses. The deposits may be in low molecular weight or polymeric form.

DETAILED DESCRIPTION OF THE INVENTION

The process is used preferably for the removal of metallic deposits. The process is used particularly preferably for the removal of deposits formed from metals used in homogeneous catalysis, especially of groups VIII and IB of the PSE, such as, for example, nickel, rhodium, palladium and platinum, copper and silver.

The process is particularly suitable for the removal of deposits that form in the direct carbonylation of hydroxy aromatic compounds to diaryl carbonates using carbon monoxide in the presence of palladium and of further co-catalysts.

The particles used for the removal of the deposits should be inert under the reaction conditions, that is to say they should not react with any component of the reaction mixture, should not catalyse secondary reactions or be dissolved, swollen or otherwise impaired in their properties by components of the reaction mixture.

They must have sufficient mechanical strength under the pressure and temperature conditions of the reaction so that, on the one hand, they are able to remove the deposits but, on the other hand, they do not themselves break into ever smaller particles whose abrasive action would diminish on falling below a particular limit and which could only be removed with difficulty during subsequent separation of the particles.

Owing to their outstanding mechanical properties, preference is therefore given to the use of polymers such as, for example, elastomers, thermoplastics or thermosetting plastics. Particular preference is given to thermoplastics, since it is thus possible, in a simple manner, to prepare particles of the desired form which are sufficiently hard and resistant to abrasion. The thermoplastics are preferably in the semi-crystalline or glass-like state under the reaction conditions. They may be linear or branched.

The property of chemical inertness towards the majority of reaction media is met by fluoropolymers in particular. Such fluoropolymers may be blends having at least one fluorine-containing polymer component, homo- or co-polymers of various fluorinated constituents or of fluorinated constituents with non-fluorinated constituents. The copolymer structures known to the person skilled in the art, such as, for example, alternating, statistical, random, graft or block copolymers, can be used.

Especially suitable, owing to their commercial availability, are partially fluorinated polymers, such as polychlorotrifluoroethylene, polyvinylidene fluoride, or copolymers of ethylene and/or propylene together with tetrafluoroethylene and/or hexafluoropropylene, or perfluorinated polymers, such as copolymers of tetrafluoroethylene and hexafluoropropylene, polytetrafluoroethylene, or perfluoroalkoxy polymers.

In addition, according to the chemical nature and aggressivity of the reaction medium, it is also possible to use other, optionally less expensive, polymers which are known to the person skilled in the art and are chemically inert under the reaction conditions, such as, for example, polyethylene, polypropylene, polystyrene and its copolymers, polyvinyl chloride, polyoxymethylene, polymethyl methacrylate, polyimide, polyether ether ketone, polyphenylene sulfide, polyphenylene oxide, polyethylene terephthalate, polybutylene terephthalate or polyamide.

In addition to the mentioned polymers, it is also possible to use other substances as inert auxiliary bodies, for example glass fibres or carbon fibres, glass fragments, clay spheres, metal spheres, filings and sawdust, pumice, quartz sand, sheet silicates such as talc, optionally in any desired mixture of those substances, if their mechanical and chemical stability and hardness permits their use under the mentioned conditions.

The particles used must have a particular minimum size in order to be able to remove the deposits, in order to be readily handled and separated off easily. Accordingly, the particles used expediently have a dimension of from approximately 50 micrometres to approximately 5 cm in their longest cartesian axis. Particles having a longest dimension of from 500 micrometres to 3 cm are preferred. Particles whose longest dimension is approximately from 1 mm to 2 cm are particularly preferred. The particles are preferably not too anisotropic, that is to say the ratio of all the cartesian dimensions of the particle relative to one another is approximately from 0.1 to 10. They are preferably approximately spherical, rhombic, cylindrical or deformed cylindrical in the form of a parallelepiped having an elliptical cross-section. The granulate forms conventional in commercial thermoplastics are wholly suitable for the purpose.

The use of mixtures of particles of various sizes is particularly suitable for uniform distribution over all the surfaces in the reactor space. The amount of inert bodies is from 0.2 to 10% based on the weight of the reaction mixture.

Particles that float on the reaction mixture are particularly suitable for the removal of deposits which form on the walls of the reaction apparatus close to the surface of the liquid, for example by evaporation and drying or by reactions with the gas phase located above the liquid. However, it is often desirable to free all the surfaces of the reaction apparatus of deposits if possible. To that end, it is expedient for the particles to have a higher density than the reaction mixture. Preference is therefore given to particles having densities greater than approximately $1.1$ g cm$^{-3}$, particularly preferably to particles having densities greater than approximately $1.2$ g cm$^{-3}$.

For that reason, the mentioned fluoropolymers are particularly suitable, because their density is markedly higher than that of most reaction media.

The hardness of the particles used should preferably be less than that of the material of the reaction apparatus or of other surfaces in contact with the particles, so that they do not damage the surface thereof. The mass and hence the size of the particles should preferably be chosen to be at least sufficiently small that no mechanical damage can occur to parts of the reaction apparatus when the particles strike the surfaces.

The deposits can be removed preferably in the case of reactions whose reaction medium is of such a low viscosity that the particles are able to give up at the surfaces of the reactor a notable proportion of the momentum acquired during circulation of the reaction mixture. Reactions in the gas and/or liquid phase are therefore particularly suitable. Suitable liquid reaction media are, for example, homogeneous solutions, melts, micro- and macro-emulsions, as well as suspensions or sols.

The process is highly suitable for the removal of deposits in homogeneously catalysed reactions, especially in oxidative carbonylation.

The deposits formed in the oxidative carbonylation of hydroxy aromatic compounds to diaryl carbonates, for example in the carbonylation of phenol to diphenyl carbonate, can be removed very well by means of this process.

The process can be used for the removal or prevention of deposits on any surfaces that come into contact with media which tend to form deposits. Examples are reactors, pipes (feed pipes and discharge pipes), supply, storage and buffer vessels. Pipes are preferably kept free of deposits by turbulent flushing with the mixture containing the particles.

The process is used preferably for the removal or prevention of deposits on containers that contain the reaction mixture, particularly preferably of reaction apparatuses. Suitable reaction apparatuses for the process according to the invention are, for example, stirrer vessels, autoclaves, loop reactors and bubble columns, as well as further apparatuses known to the person skilled in the art, it being possible for such reaction apparatuses to be used in the form of individual reactors or in the form of a cascade. In a cascade, from 2 to 15, preferably from 2 to 10, particularly preferably from 2 to 5 reactors can be connected in series.

For the circulation of the reaction mixture, the stirrer containers to be used according to the invention are equipped with stirrers suitable therefor. Such stirrers are known to the person skilled in the art. Examples which may be mentioned are: disk, impeller, propeller, paddle, MIG (multistage impulse counter-current) and Intermig agitators, tubular stirrers and various types of hollow stirrers, for example those which permit the effective mixing of gases and liquids, for example hollow-tube gassing stirrers, propeller stirrers, etc. The combination of various types of stirrer on a shaft, or of a plurality of stirrers of one type on a shaft, is suitable for distributing the solids particles uniformly over all the surfaces in the reactor space.

In the process according to the invention, the following types of bubble column may be used: simple bubble columns, bubble columns with built-in elements, such as, for example: bubble columns with parallel chambers, cascade-type bubble columns with perforated bases or single-hole bases, bubble columns with packing, with static mixers, pulsating perforated-base bubble columns, loop reactors such as, for example: mammoth loop reactors, downflow loop reactors, jet loop reactors, open-jet reactors, jet-nozzle reactors, bubble columns with liquid immersion jet, downflow-upflow bubble columns and further bubble-column reactors known to the person skilled in the art (Chem. Ing. Tech. 51 (1979) No. 3, p. 208–216; W. -D. Deckwer, Reaktionstechnik in Blasensäulen, Otto Salle Verlag 1985).

The reaction mixture can also be circulated by pumping in a loop. A further possible method of circulating the reaction mixture consists in introducing an inert gas or reaction gas with excess pressure, or in atomising a liquid. The preferred method of circulation is stirring of the reaction mixture.

The energy introduced by the stirring or circulating member should be at least sufficiently great that the particles are able to reach all the surfaces in contact with the reaction medium. The circulation of the reaction mixture by suitable built-in elements in the reaction apparatus should optionally be such that the particles are able to strike all the surfaces of the reaction apparatus, so that the removal of deposits is as quantitative as possible.

The abrasive removal of particles functions particularly well when the particles are able to transmit sufficient momentum to the surfaces of the reaction apparatuses. The flow velocity of the auxiliary bodies at the surfaces is preferably at least approximately 2 km/h.

After the reaction, the reaction mixture can be removed from the reaction apparatus continuously or batchwise. By means of separation processes known to the person skilled in the art, such as screening, filtration, sedimentation or centrifugation, the particles can be separated from the reaction mixture and fed back into the reaction apparatus, or retained therein.

Preference is given to a process in which the particles are retained in the reaction apparatus by means of screens or filters having mesh or pore sizes which are smaller than the smallest cartesian dimension of the particles.

The process according to the invention is preferably carried out in such a manner that the deposits detached by the particles are either discharged from the reaction apparatus together with the reaction mixture and then separated off or, particularly preferably, are separated from the reaction mixture directly at the outlet by means of a suitable separating operation, such as, for example, screening, sedimentation or filtration, and are thus retained in the reactor.

A further preferred embodiment consists in separating off the particles together with the deposits, working up the deposits chemically, then separating off the particles or returning the particles to the reaction again together with the worked-up deposits without separating them off. For example, the palladium deposits formed in an oxidative carbonylation can be reacted oxidatively in the presence of the particles to form, for example, palladium bromide or palladium acetate and transferred to the reactor again in a mixture with the particles.

EXAMPLES

Example 1

50 mg/kg of palladium (in the form of palladium bromide), 311 mg/kg of Mn (in the form of manganese trisacetylacetonate), 3 wt. % tetrabutylammonium bromide, 2 wt. % tetrabutylammonium phenolate and 14% phenol in chlorobenzene are placed in an autoclave having a gassing stirrer. Approximately 8 wt. % of rhombic polytetrafluoroethylene particles 2 mm×2 mm×1 mm in size are added to the reaction mixture, and a gas mixture of carbon monoxide and oxygen (97:3 vol. %) is passed in continuously at 110° C. at an overall pressure of 3 bar. After one hour's intensive stirring, the reaction mixture is removed. After repeating the reaction several times, the solids deposited in the reactor are removed mechanically and the palladium content is determined by a combination of weighing and elemental analysis (see Table 1).

Example 2

Comparative Example

The test is carried out analogously to Example 1, but without the addition of polytetrafluoroethylene particles.

TABLE 1

| | Visual impression: | Palladium deposits in the reactor*: |
|---|---|---|
| Ex. 1 | Virtually no deposits | <1% |
| Ex. 2 (comp.) | Black metallic mirror | 41% |

*in percent of the amount used

The data in Table 1 show that it is possible to avoid deposits in a reactor virtually completely by the addition of particles of an inert material.

What is claimed is:

1. A process for the removal of metallic deposits comprising
reacting in a reaction apparatus a reaction mixture containing at least one hydroxy aromatic compound with carbon monoxide in the presence of a palladium homogeneous catalyst and a co catalyst to form diaryl carbonate and metallic deposits and rubbing, by movement or stirring of the reaction mixture, at least in the space of the reaction apparatus inert auxiliary bodies over surfaces of the reaction apparatus and in contact with the reaction mixture to remove said deposits therefrom,
wherein said auxiliary bodies comprise at least one fluoropolymer.

2. The process according to claim 1 in which the bodies have a dimension in their longest cartesian axis of 50 micrometers to 5 cm.

3. The process according to claim 1, in which the bodies conform to a shape selected from the group consisting of approximately spherical, cylindrical, rhombic and parallelepiped having an elliptical cross-section.

4. The process according to claim 1 in which the ratio of all the cartesian dimensions of the bodies relative to one another is 0.1 to 10.

5. The process according to claim 1 which the density of the bodies is greater than the density of the reaction mixture.

6. The process according to claim 1 in which the metallic deposit contains transition metals of group VIII or IB.

7. The process according to claim 1, wherein the fluropolymer is at least one member selected from the group consisting of partially fluorinated homopolymer, partially fluorinated copolymer, perfluorinated homopolymer and perfluorinated copolymer.

8. The process according to claim 1, wherein the fluropolymer is at least one member selected from the group consisting of polychlorotrifluoroethylene, polyvinylidene fluoride, a copolymer of ethene or propene and tetrafluoroethylene or hexafluoropropylene, a copolymer of tetrafluoroethylene and hexafluoropropylene, perfluoroalkoxy fluoropolymer and polytetrafluoroethylene.

9. The process according to claim 1 wherein the reaction apparatus comprises at least one member selected from the group consisting of stirred vessel, an autoclave, a bubble column, a tubular reactor and a loop reactor.

10. The process according to claim 1 wherein the bodies have a concentration of from 0.2 to 10% based on the weight of the reaction mixture.

11. The process according to claim 5, in which the density of the bodies is greater than 1.1 g/cm$^3$.

* * * * *